United States Patent
Bi et al.

(10) Patent No.: US 11,768,393 B2
(45) Date of Patent: Sep. 26, 2023

(54) LIQUID CRYSTAL ANTENNA SUBSTRATE AND MANUFACTURING METHOD THEREOF, AND LIQUID CRYSTAL ANTENNA AND MANUFACTURING METHOD THEREOF

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yao Bi, Beijing (CN); Hongliang Yuan, Beijing (CN); Li Ma, Beijing (CN); Xiaojuan Wu, Beijing (CN); Huishun Chen, Beijing (CN); Qi Zheng, Beijing (CN); Zhiqiang Zhao, Beijing (CN); Zhangxiang Cheng, Beijing (CN); Jiaxing Wang, Beijing (CN); Xuan Zhong, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 241 days.

(21) Appl. No.: 16/755,644

(22) PCT Filed: Oct. 16, 2019

(86) PCT No.: PCT/CN2019/111488
§ 371 (c)(1),
(2) Date: Apr. 13, 2020

(87) PCT Pub. No.: WO2020/093845
PCT Pub. Date: May 14, 2020

(65) Prior Publication Data
US 2021/0215956 A1 Jul. 15, 2021

(30) Foreign Application Priority Data
Nov. 8, 2018 (CN) .......................... 201811323837.4

(51) Int. Cl.
*G02F 1/1339* (2006.01)
*H01Q 3/34* (2006.01)
(Continued)

(52) U.S. Cl.
CPC ........ *G02F 1/1313* (2013.01); *G02F 1/13394* (2013.01); *H01Q 1/364* (2013.01); *H01Q 3/34* (2013.01)

(58) Field of Classification Search
CPC .............. G02F 1/1313; G02F 1/13394; G02F 1/13398; H01Q 3/334; H01Q 21/065
See application file for complete search history.

(56) References Cited

U.S. PATENT DOCUMENTS 5,956,112 A * 9/1999 Fujimori et al. ...... G02F 1/1339 349/156
6,741,314 B2 * 5/2004 Song ................. G02F 1/133753 349/144
(Continued)

FOREIGN PATENT DOCUMENTS

CN 1693975 A 11/2005
CN 106932933 A 7/2017
(Continued)

OTHER PUBLICATIONS

English language translation of Chinese Patent Application Publication CN 106932933, published Jul. 7, 2017; document downloaded from Espacenet at http://https://worldwide.espacenet.com; translation obtained from Google Translate tool on-site (Year: 2017).*

*Primary Examiner* — Angela K Davison
(74) *Attorney, Agent, or Firm* — Dilworth & Barrese, LLP.; Michael J. Musella, Esq.

(57) ABSTRACT

A liquid crystal antenna substrate and a manufacturing method thereof, and a liquid crystal antenna and a manufacturing method thereof are provided. The manufacturing
(Continued)

method of the liquid crystal antenna substrate includes: forming a conductive pattern on a base substrate; coating a liquid photo-curable material at a side of the conductive pattern away from the base substrate; and using the conductive pattern as a mask to perform an exposure process from a side of the base substrate away from the conductive pattern, a portion of the liquid photo-curable material corresponding to the conductive pattern is cured to form spacers.

13 Claims, 4 Drawing Sheets

(51) Int. Cl.
  G02F 1/13 (2006.01)
  H01Q 1/36 (2006.01)

(56) References Cited

U.S. PATENT DOCUMENTS

| | | | |
|---|---|---|---|
| 2007/0059901 A1 | 3/2007 | Majumdar et al. | |
| 2016/0342078 A1* | 11/2016 | Lu | G03F 1/38 |
| 2020/0124900 A1* | 4/2020 | Zhou et al. | G02F 1/1333 |

FOREIGN PATENT DOCUMENTS

| | | | |
|---|---|---|---|
| CN | 106961008 A | 7/2017 | |
| CN | 109462009 A | 3/2019 | |
| JP | 2007116573 A | 5/2007 | |

* cited by examiner

LIQUID CRYSTAL ANTENNA SUBSTRATE AND MANUFACTURING METHOD THEREOF, AND LIQUID CRYSTAL ANTENNA AND MANUFACTURING METHOD THEREOF

The present application claims priority to the Chinese patent application No. 201811323837.4 filed on Nov. 8, 2018. For all purposes, the entire disclosure of which is incorporated herein by reference as part of the present application.

TECHNICAL FIELD

Embodiments of the present disclosure provide a liquid crystal antenna substrate and a manufacturing method thereof, and a liquid crystal antenna and a manufacturing method thereof.

BACKGROUND

With the continuous development of communication technology, people have a greater and greater demand for communication with large capacity and high transmission speed. A liquid crystal antenna is an antenna that changes a magnitude of a shifted phase of a phase shifter by controlling a rotation direction of the liquid crystal molecules having dielectric anisotropy, thereby adjusting an alignment direction of the phased array antenna.

Compared with traditional horn antennas, spiral antennas and array antennas, liquid crystal antennas are antennas more suitable for the current technology development direction for having the characteristics of miniaturization, wide frequency bands, multi-bands, and high gains.

SUMMARY

Embodiments of the present disclosure provide a manufacturing method of a liquid crystal antenna substrate, which includes: forming a conductive pattern on a base substrate; coating a liquid photo-curable material at a side of the conductive pattern away from the base substrate; and performing an exposure process from a side of the base substrate away from the conductive pattern by using the conductive pattern as a mask; a portion of the liquid photo-curable material not corresponding to the conductive pattern is cured to form spacers.

For example, the manufacturing method of the liquid crystal antenna substrate provided by an embodiment of the present disclosure further includes: removing a portion of the liquid photo-curable material that is uncured after performing the exposure process from the side of the base substrate away from the conductive pattern by using the conductive pattern as a mask.

For example, in the manufacturing method of the liquid crystal antenna substrate provided by an embodiment of the present disclosure, removing the portion of the liquid photo-curable material that is uncured includes: using a solvent to dissolve and remove the portion of the liquid photo-curable material that is uncured.

For example, in the manufacturing method of the liquid crystal antenna substrate provided by an embodiment of the present disclosure, the liquid photo-curable material includes an epoxy resin, a diluent, and a photoinitiator.

For example, in the manufacturing method of the liquid crystal antenna substrate provided by an embodiment of the present disclosure, a shape of an orthographic projection of the conductive pattern on the base substrate is complementary to a shape of an orthographic projection of the spacers on the base substrate.

For example, in the manufacturing method of the liquid crystal antenna substrate provided by an embodiment of the present disclosure, a material of the conductive pattern is an opaque material.

For example, in the manufacturing method of the liquid crystal antenna substrate provided by an embodiment of the present disclosure, a size of the spacers in a direction perpendicular to the base substrate is greater than 50 microns.

For example, the manufacturing method of the liquid crystal antenna substrate further includes: forming an alignment film at the side of the conductive pattern away from the base substrate before coating the liquid photo-curable material at the side of the conductive pattern away from the base substrate.

At least one embodiment of the present disclosure provides a manufacturing method of a liquid crystal antenna, which includes: manufacturing a liquid crystal antenna substrate by using any one of the manufacturing methods of the liquid crystal antenna substrate as described above; providing a liquid crystal molecular material between adjacent ones of the spacers; and providing an opposing substrate at a side of the spacers away from the base substrate; the opposing substrate includes a substrate, a common electrode located at a side of the substrate close to the liquid crystal antenna substrate and a radiation patch located at a side of the substrate away from the liquid crystal antenna substrate, and the common electrode has an opening in an overlapping region of the radiation patch and the conductive pattern.

At least one embodiment of the present disclosure provides a liquid crystal antenna substrate, which includes: a base substrate; a conductive pattern located on the base substrate; spacers located at a side of the conductive pattern away from the base substrate; the spacers are obtained by performing an exposure process on a liquid photo-curable material from a side of the base substrate away from the conductive pattern by using the conductive pattern as a mask, and a portion of the liquid photo-curable material not corresponding to the conductive pattern is cured to form the spacers, and a shape of an orthographic projection of the conductive pattern on the base substrate is complementary to a shape of an orthographic projection of the spacers on the base substrate.

For example, in the liquid crystal antenna substrate provided by an embodiment of the present disclosure, a material of the conductive pattern is an opaque material.

For example, in the liquid crystal antenna substrate provided by an embodiment of the present disclosure, a size of the spacers in a direction perpendicular to the base substrate is greater than 50 microns.

For example, the liquid crystal antenna substrate provided by an embodiment of the present disclosure further includes: an alignment film between the conductive pattern at a side of the conductive pattern away from the base substrate.

At least one embodiment of the present disclosure provides a liquid crystal antenna, which includes: the liquid crystal antenna substrate as described above; an opposing substrate located at a side of the spacers away from the base substrate; and a liquid crystal layer located between the base substrate and the opposing substrate and located between adjacent ones of the spacers; the opposing substrate includes a substrate, a common electrode located at a side of the substrate close to the liquid crystal antenna substrate, and a radiation patch located at a side of the substrate away from the liquid crystal antenna substrate, and the common electrode has an opening in an overlapping region of the radiation patch and the conductive pattern.

BRIEF DESCRIPTION OF THE DRAWINGS

Hereinafter, the drawings accompanying embodiments of the present disclosure are simply introduced in order to more clearly explain technical solution(s) of the embodiments of the present disclosure. Obviously, the described drawings below are merely related to some of the embodiments of the present disclosure without constituting any limitation thereto.

DETAILED DESCRIPTION

Figure 1:
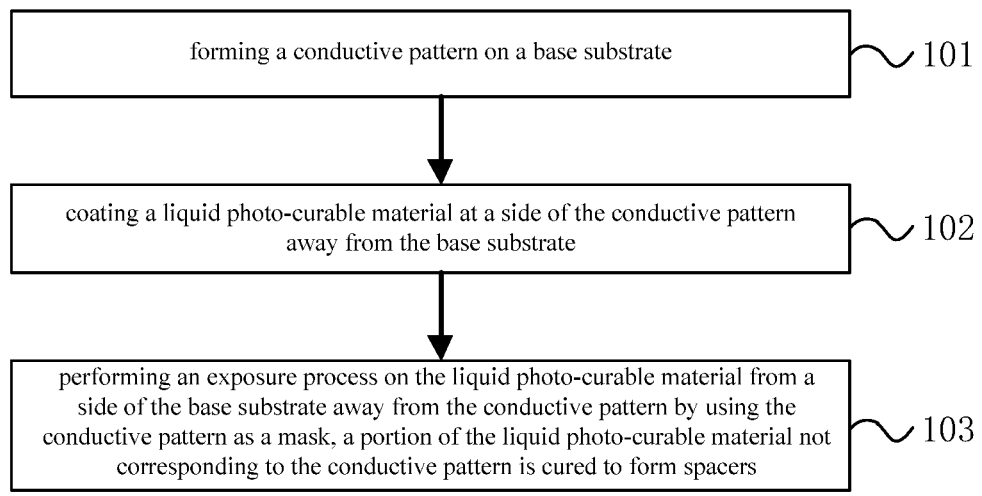
FIG. 1 is a flowchart illustrating a manufacturing method of a liquid crystal antenna substrate provided by an embodiment of the present disclosure.

In order to make objectives, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

At present, a manufacturing process of a liquid crystal antenna and a manufacturing process of thin film transistor liquid crystal display (TFT-LCD) can be mutually referred because both of them include processes such as film formation, exposure, etching, liquid crystal filling, and cell assembling, that is to say, the liquid crystal antenna can be manufactured by using a device for manufacturing a TFT-LCD. Compared with a liquid crystal layer of a TFT-LCD, a liquid crystal layer of the liquid crystal antenna is thicker, thus the liquid crystal antenna needs to form a higher spacer and to fill more liquid crystal material. However, the production of higher spacers is difficult, and the price of liquid crystal materials is also higher. Therefore, the manufacture of the liquid crystal antenna is more difficult and the manufacturing cost is also higher.

Embodiments of the present disclosure provide a liquid crystal antenna substrate and a manufacturing method thereof, and a liquid crystal antenna and a manufacturing method thereof. The manufacturing method of the liquid crystal antenna substrate includes: forming a conductive pattern on a base substrate; coating a liquid photo-curable material at a side of the conductive pattern away from the base substrate; and performing an exposure process from a side of the base substrate away from the conductive pattern by using the conductive pattern as a mask, and a portion of liquid photo-curable material not corresponding to the conductive pattern is cured to form spacers. The manufacturing method of the liquid crystal antenna substrate utilizes the characteristics that the liquid photo-curable material can be cured by an exposure process, and uses a conductive pattern as a mask to expose the liquid photo-curable material to form spacers. On the one hand, in the manufacturing method of the liquid crystal antenna substrate, spacers are formed by exposing the liquid photo-curable material, and no process such as etching is required, so that the process steps can be reduced, the difficulty on manufacturing is less and the cost on manufacturing are reduced. Furthermore, in the manufacturing method of the liquid crystal antenna substrate, liquid crystal molecules can be provided only at a position corresponding to the conductive pattern, which can reduce a usage amount of liquid crystal molecules, thereby further reducing the manufacturing cost. On the other hand, the manufacturing method of the liquid crystal antenna substrate can also avoid the problem of uneven coating of the alignment film caused by the formation of a thick spacer, thereby improving the yield of the product.

The liquid crystal antenna substrate and the manufacturing method thereof and the liquid crystal antenna and the manufacturing method thereof provided in the embodiments of the present disclosure will be described below with reference to the drawings.

An embodiment of the present disclosure provides a manufacturing method of a liquid crystal antenna substrate. FIG. 1 is a flowchart illustrating a manufacturing method of a liquid crystal antenna substrate provided by an embodiment of the present disclosure. FIG. 2A-FIG. 2D are step-by-step diagrams illustrating a manufacturing method of a liquid crystal antenna substrate provided by an embodiment of the present disclosure. As illustrated in FIG. 1, the manufacturing method of the liquid crystal antenna substrate includes the following steps S101-S103.

Step S101: forming a conductive pattern on a base substrate.

Figure 2A:
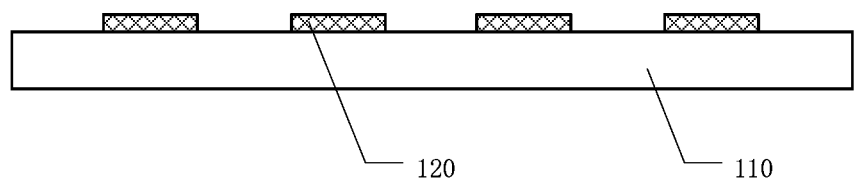
FIG. 2A-FIG. 2D are step-by-step diagrams illustrating a manufacturing method of a liquid crystal antenna substrate provided by an embodiment of the present disclosure.

For example, as illustrated in FIG. 2A, forming a conductive pattern 120 on a base substrate 110.

For example, the base substrate may be a transparent substrate such as a glass substrate, a plastic substrate, or a quartz substrate. The conductive pattern can be formed by firstly forming a conductive film layer on the base substrate and then performing a patterning process on the conductive film layer. A material of the conductive film layer can be selected from metal materials, such as copper, silver, gold, aluminum, and the like.

Step S102: coating a liquid photo-curable material at a side of the conductive pattern away from the base substrate.

Figure 2B:
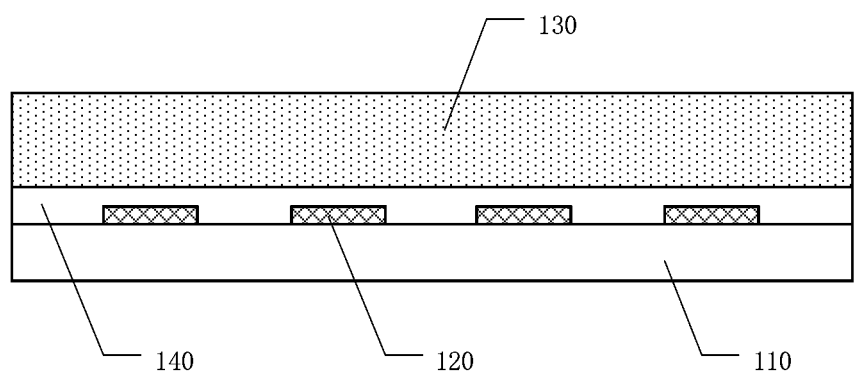

For example, as illustrated in FIG. 2B, coating a liquid photo-curable material 130 at a side of the conductive pattern 120 away from the base substrate 110. For example, the liquid photo-curable material may be a liquid photo-curable adhesive.

For example, an amount of the liquid photo-curable material to be coated may be determined according to a height of the spacers to be formed. In the case where the height of the spacers to be formed is high, the amount of the liquid photo-curable material to be coated may be great. In the case where the height of the spacers to be formed is low, the amount of the liquid photo-curable material to be coated may be relatively less.

Step S103: performing an exposure process on the liquid photo-curable material from a side of the base substrate away from the conductive pattern by using the conductive pattern as a mask, so that a portion of the liquid photo-curable material not corresponding to the conductive pattern is cured to form spacers.

Figure 2C:
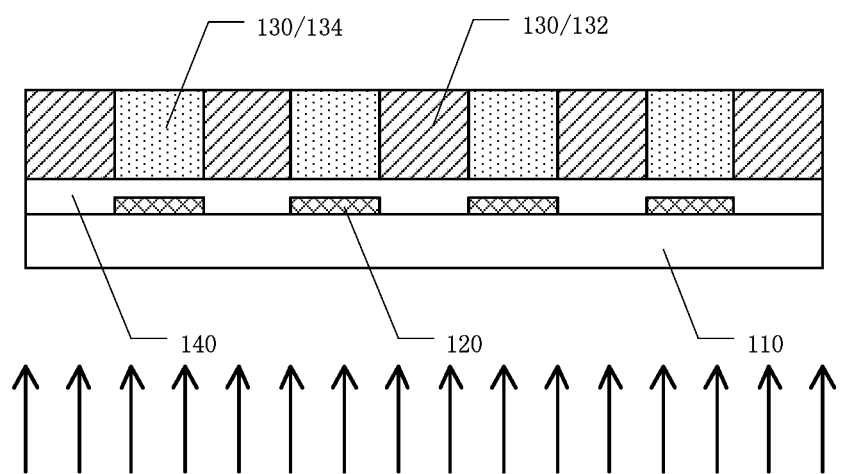

For example, as illustrated in FIG. 2C, performing an exposure process on the liquid photo-curable material 130 from the side of the base substrate 110 away from the conductive pattern 120 by using the conductive pattern 120 as a mask. For example, ultraviolet light may be used to perform the exposure process. Thereafter, as illustrated in FIG. 2C, a portion 132 of the liquid photo-curable material 130 that is exposed is cured to form a solid photo-curable material 132, and a portion 134 of the liquid photo-curable material 130 that is unexposed remains in a liquid state.

In the manufacturing method of the liquid crystal antenna substrate provided by this embodiment, after performing the exposure process on the liquid photo-curable material from the side of the base substrate away from the conductive pattern by using the conductive pattern as a mask, an exposed portion of the liquid photo-curable material is cured to form a solid photo-curable material, and an unexposed portion of the liquid photo-curable material remains in a liquid state. A portion of the liquid photo-curable material corresponding to the conductive pattern is unexposed, and a portion of the liquid photo-curable material not corresponding to the conductive pattern is exposed. In this case, the portion of the liquid photo-curable material not corresponding to the conductive pattern is cured, so that spacers in a solid state can be formed. In the manufacturing method of the liquid crystal antenna substrate, spacers are formed by exposing a liquid photo-curable material, and the process such as etching is not required, so that the process steps can be reduced, the difficulty on manufacturing is reduced and the cost on manufacturing is also reduced, and the above-mentioned exposure process uses a conductive pattern as a mask without using an additional mask, thereby further reducing the manufacturing cost. In addition, the manufacturing method of the liquid crystal antenna substrate can provide liquid crystal molecules only at the position corresponding to the conductive pattern, which can reduce a usage amount of liquid crystal molecules, which can further reduce manufacturing cost.

For example, in some exemplary embodiments, the conductive pattern may include a bent conductive line, and the bent conductive line may serve as a signal line of the liquid crystal antenna.

For example, in some exemplary embodiments, the manufacturing method of the liquid crystal antenna substrate further includes: removing a portion of the liquid photo-curable material that is uncured after performing the exposure process on the conductive pattern as a mask from the side of the base substrate away from the conductive pattern. An exposed portion of the liquid photo-curable material is cured to form a solid photo-cured material, and an unexposed portion of the liquid photo-cured material remains in a liquid state. Therefore, the portion of the liquid photo-curable material that is uncured can be simply removed, so that the remaining solid photo-curable material forms spacers.

Figure 2D:
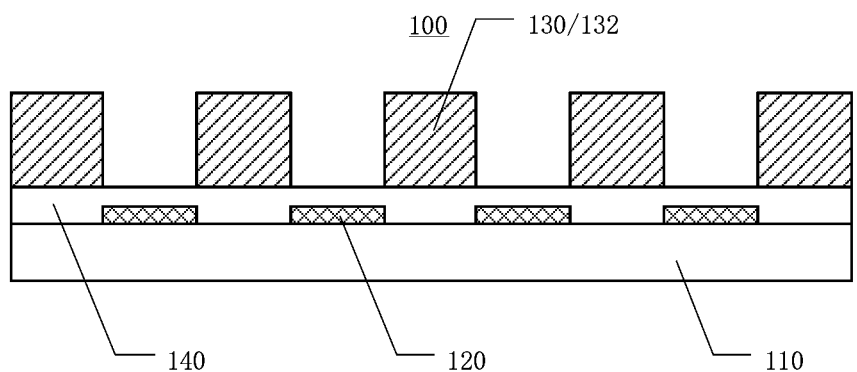

For example, as illustrated in FIG. 2D, by removing the portion 134 of the liquid photo-curable material that is uncured, a solid photo-curable material 132, that is, spacers 132, can be obtained.

For example, in some exemplary embodiments, in the manufacturing method of a liquid crystal antenna substrate, removing the portion of the liquid photo-curable material that is uncured includes using a solvent to dissolve and remove the portion of the liquid photo-curable material that is uncured. As a result, the portion of the liquid photo-curable material that is uncured is dissolved and removed by the solvent, which has less influence on other film layers or structures on the base substrate, which is beneficial to improving the quality of the product.

For example, in some exemplary embodiments, the liquid photo-curable material includes an epoxy resin, a diluent and a photoinitiator, of course, the embodiments of the present disclosure include, but are not limited thereto, and the liquid photo-curable material may further include an auxiliary agent, for example, a dispersant, a stabilizer, and the like.

For example, the epoxy resin may be NOA65, the diluent is isobornyl acrylate, and the photoinitiator is 1184 photoinitiator.

For example, in some exemplary embodiments, because the spacers are formed by exposing the liquid photo-curable material from the side of the base substrate away from the conductive pattern by using the conductive pattern as a mask, a shape of an orthographic projection of the conductive pattern on the substrate is complementary to a shape of an orthographic projection of the spacers on the base substrate. Therefore, in the subsequent process of providing the liquid crystal material, because the shape of the orthographic projection of the spacers is complementary to the shape of the orthographic projection of the conductive pattern on the base substrate, it is only necessary to provide the liquid crystal material at a position corresponding to the conductive pattern, thereby reducing a usage amount of the liquid crystal material and reducing the manufacturing cost of the liquid crystal antenna substrate. It should be explained that the above-mentioned shape complementation refers to that the orthographic projection of the conductive pattern on the base substrate is not overlapped with the orthographic projection of the spacers on the base substrate, and the orthographic projection of the conductive pattern on the base substrate abuts against the orthographic projection of the spacers on the base substrate to occupy a complete area.

For example, in some exemplary embodiments, the conductive pattern includes an opaque material, which is convenient to serve as a mask.

For example, in some exemplary embodiments, a size of the spacers in a direction perpendicular to the substrate is greater than 50 microns. For another example, the size of the spacers in the direction perpendicular to the base substrate is greater than 100 microns.

For example, in some exemplary embodiments, the manufacturing method of the liquid crystal antenna substrate further includes: forming an alignment film at the side of the conductive pattern away from the base substrate before coating the liquid photo-curable material at the side of the conductive pattern away from the base substrate. It should be explained that the above-mentioned alignment film may be an alignment film that has undergone an alignment process, for example, an alignment film that has undergone a rubbing alignment process. A relatively thick spacer (for example, spacers having a thickness of more than 50 microns) is likely to cause uneven coating of the alignment film around the spacers in a subsequent process of coating the alignment film. The manufacturing method of the liquid crystal antenna substrate provided by this embodiment can form spacers after forming the alignment film, thereby avoiding the problem of uneven coating of the alignment film caused by the formation of a thicker spacer, thereby improving the yield of the product.

For example, as illustrated in FIG. 2B, forming an alignment film 140 at the side of the conductive pattern 120 away from the base substrate 110 before coating the liquid photo-curable material 130 at the side of the conductive pattern 120 away from the base substrate 110.

For example, a material of the alignment film 140 may include polyimide. Of course, the embodiments of the present disclosure include but are not limited thereto.

Figure 3:
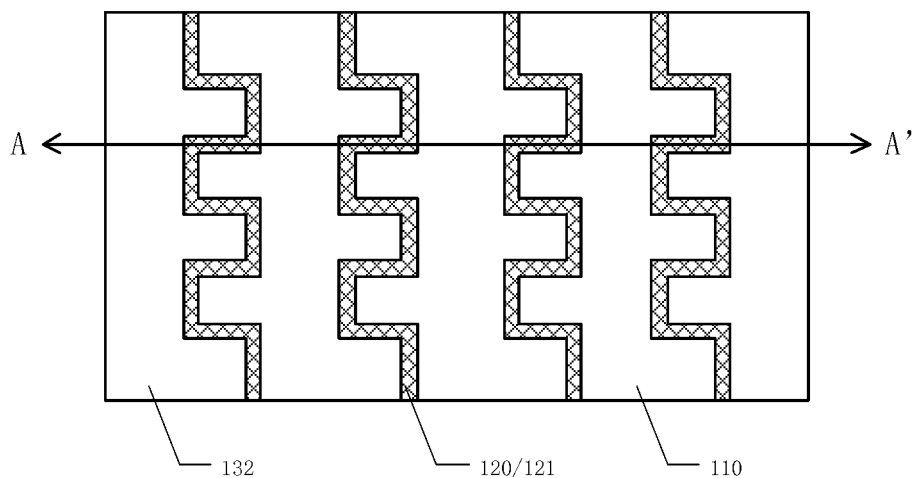
FIG. 3 is a schematic plan view illustrating a liquid crystal antenna substrate provided by an embodiment of the present disclosure.

An embodiment of the present disclosure further provides a liquid crystal antenna substrate. As illustrated in FIG. 2D, the liquid crystal antenna substrate includes a base substrate 110; a conductive pattern 120 on the base substrate 110; and spacers 132 at a side of the conductive pattern 120 away from the base substrate 110. A material of the spacers 132 may include a photo-curable adhesive. The spacers are obtained by exposing the liquid photo-curable material from the side of the base substrate 110 away from the conductive pattern 120 with the conductive pattern 120 as a mask. The liquid photo-curable material not corresponding to the conductive pattern 120 is cured to form spacers 132, and the spacers 132 are formed by using a photo-curable adhesive. As illustrated in FIG. 3, a shape of the orthographic projection of the conductive pattern 120 on the base substrate 110 is complementary to the orthographic shape of the spacers 132 on the base substrate 110.

In the liquid crystal antenna substrate provided by the embodiment of the present disclosure, the spacers may be formed by exposing the liquid photo-curable material without using a process such as etching, thereby reducing process steps, reducing manufacturing difficulty and cost, and the above conductive pattern can be used as a mask during the exposure process without using an additional mask, which further reduces the manufacturing cost. In addition, because a shape of the orthographic projection of the spacers on the base substrate is complementary to a shape of the orthographic projection of the conductive pattern on the base substrate, the liquid crystal material is arranged only at the position corresponding to the conductive pattern, so that a usage amount of the liquid crystal material can be reduced, thereby reducing the manufacturing cost of the liquid crystal antenna substrate.

For example, the base substrate may be a transparent substrate such as a glass substrate, a plastic substrate, or a quartz substrate. The conductive pattern can be formed by firstly forming a conductive film layer on the base substrate and then performing a patterning process on the conductive film layer. A material of the conductive film layer may be selected from metal materials, such as copper, silver, gold, aluminum, and the like.

FIG. 3 is a schematic plan view illustrating a liquid crystal antenna substrate provided by an embodiment of the present disclosure. FIG. 2D is a schematic cross-sectional view illustrating the liquid crystal antenna substrate of FIG. 3 taken along line AA'. As illustrated in FIG. 3, the conductive pattern 120 may include a bent conductive line 121, for example, a snake-shaped bent conductive line 121 to serve as a signal line of a liquid crystal antenna.

For example, in some exemplary embodiments, a material of the spacers may include an epoxy resin, a diluent, and a photoinitiator. Of course, the embodiments of the present disclosure include, but are not limited thereto, and the material of the spacers may further include auxiliary agents, such as a dispersant, a stabilizer, and the like.

For example, in some exemplary embodiments, the conductive pattern includes an opaque material, that is, the conductive pattern is not transparent, which is convenient to serve as a mask.

For example, in some exemplary embodiments, a size of the spacers in a direction perpendicular to the substrate is greater than 50 microns. For another example, the size of the spacers in the direction perpendicular to the base substrate is greater than 100 microns.

For example, in some exemplary embodiments, as illustrated in FIG. 2D, the liquid crystal antenna substrate further includes an alignment film 140 between the conductive pattern 120 and the spacers 132. It should be explained that the above-mentioned alignment film 140 may be an alignment film that has undergone e an alignment process, such as an alignment film that has undergone a rubbing alignment process. Because the spacers having a relatively large thickness is likely to cause uneven coating of the alignment film around the spacers in the subsequent process of coating the alignment film, the liquid crystal antenna substrate provided in this embodiment can form the spacers after forming the alignment film, which can avoid the problem of uneven coating of the alignment film caused by the formation of a thicker spacer, thereby improving the yield of the product.

For example, a material of the alignment film 140 may include polyimide. Of course, the embodiments of the present disclosure include but are not limited thereto.

Figure 4A:
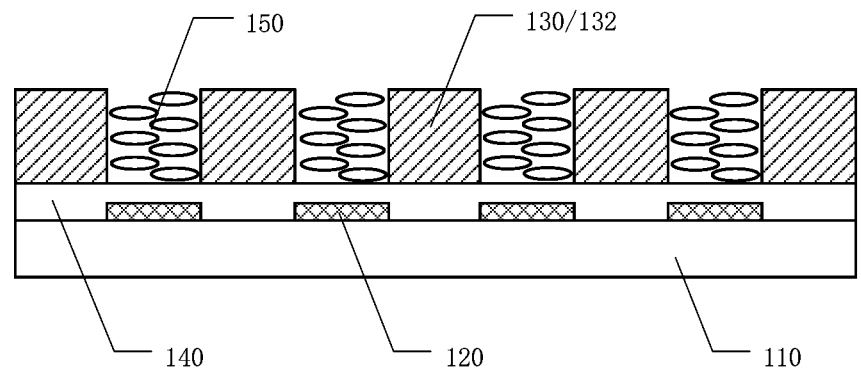
FIG. 4A-FIG. 4B are step-by-step diagrams illustrating a manufacturing method of a liquid crystal antenna provided by an embodiment of the present disclosure.
Figure 4B:
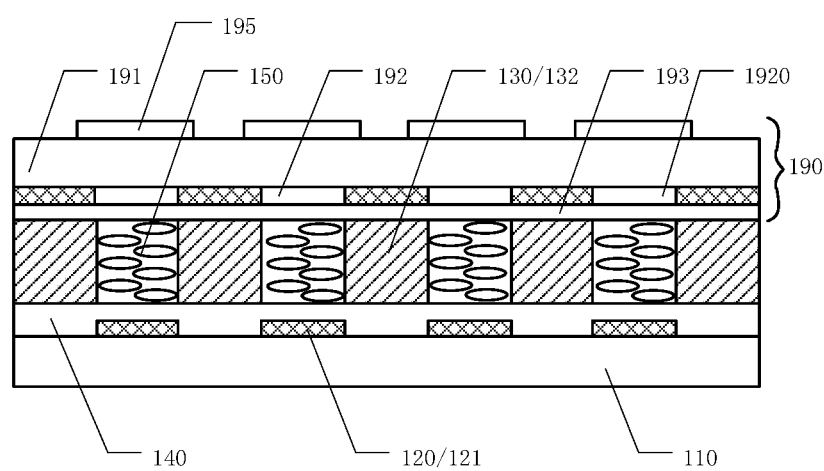

At least one embodiment of the present disclosure also provides a manufacturing method of a liquid crystal antenna. FIG. 4A-FIG. 4B are step-by-step diagrams illustrating a manufacturing method of a liquid crystal antenna provided by an embodiment of the present disclosure. The manufacturing method of the liquid crystal antenna includes: forming the liquid crystal antenna substrate by using any one of the manufacturing methods of the liquid crystal antenna substrate; providing a liquid crystal molecular material between adjacent ones of the spacers; and providing an opposing substrate at a side of the spacers away from the base substrate. The opposing substrate includes a substrate, a common electrode located at a side of the substrate close to the liquid crystal antenna substrate, and a radiation patch located at a side of the substrate away from the liquid crystal antenna substrate. The common electrode has an opening in an overlapping region of the radiation patch and the common electrode. The opposing substrate provided at a side of the spacers away from the base substrate seals the liquid crystal molecular material between the base substrate and the opposing substrate. For example, the liquid crystal antenna manufactured by the manufacturing method of the liquid crystal antenna can use the dielectric anisotropy of the liquid crystal molecular material to control a rotation direction of the liquid crystal molecules by the conductive pattern to change a magnitude of a shifted phase of a phase shifter, thereby adjusting an alignment direction of the phased array antenna.

For example, as illustrated in FIG. 4A, providing a liquid crystal molecular material between the spacers 132 to form a liquid crystal layer 150. For example, as illustrated in FIG. 4B, providing an opposing substrate 190 at a side of the spacers 132 that is away from the base substrate 110.

For example, as illustrated in FIG. 4B, the opposing substrate 190 includes a substrate 191, a common electrode 192 located at a side of the substrate 191 close to the liquid crystal antenna substrate, and a radiation patch 195 at a side of the substrate 191 away from the liquid crystal antenna substrate. The common electrode 192 has an opening 1920 at an overlapping region of the radiation patch 195 and the conductive pattern 120 so that an electromagnetic wave signal can be emitted from the radiation patch 195.

For example, in some exemplary embodiments, the manufacturing method of a liquid crystal antenna substrate further includes: providing an opposing substrate. Providing the opposing substrate may include: forming a common electrode on a substrate; forming an alignment film at a side of the common electrode away from the substrate to form the opposing substrate; and forming a radiation patch at a side of the substrate away from the common electrode.

Figure 5:
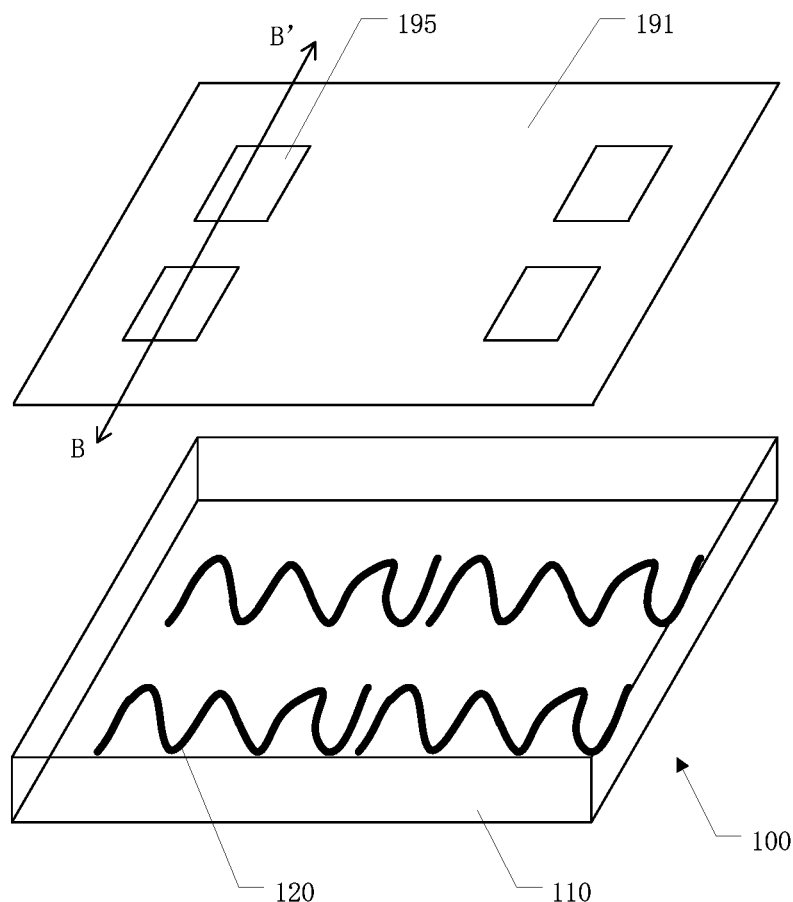
FIG. 5 is a schematic exploded view illustrating a liquid crystal antenna provided by an embodiment of the present disclosure.
Figure 6:
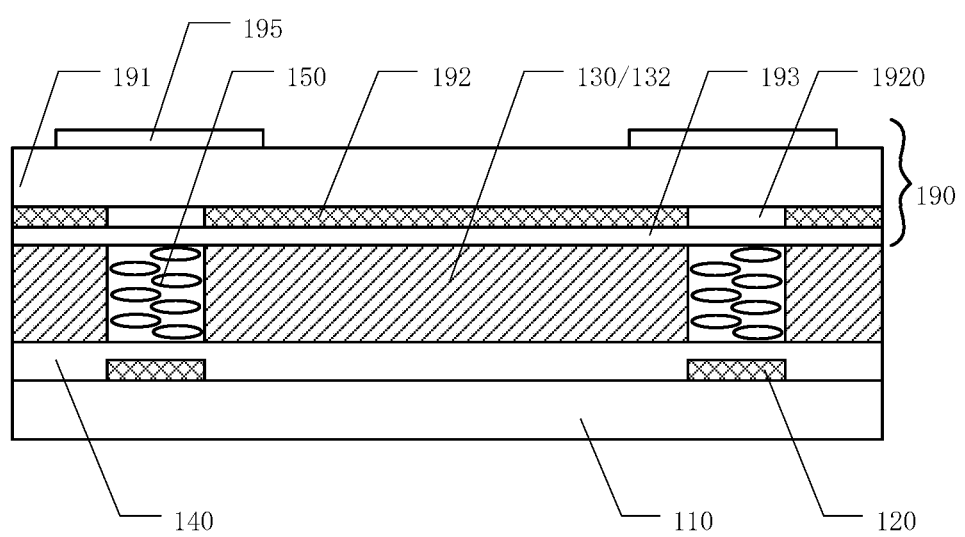
FIG. 6 is a schematic cross-sectional view illustrating a liquid crystal antenna of FIG. 4 taken along line BB' provided by an embodiment of the present disclosure.

For example, the substrate may be a transparent substrate such as a glass substrate, a plastic substrate, or a quartz substrate. The common electrode can be formed by firstly forming a conductive film layer on a base substrate and then performing a patterning process on the conductive film layer. A material of the common electrode may be selected from metal materials (such as copper, silver, gold, aluminum) or transparent metal oxides (such as indium tin oxide). An embodiment of the present disclosure further provides a liquid crystal antenna. FIG. 5 is a schematic exploded view illustrating a liquid crystal antenna provided by an embodiment of the present disclosure. FIG. 6 is a schematic cross-sectional view illustrating a liquid crystal antenna of FIG. 5 taken along line BB' provided by an embodiment of the present disclosure. As illustrated in FIG. 5, the liquid crystal antenna includes the liquid crystal antenna substrate 100 described above; an opposing substrate 190 at a side of the spacers 132 away from the base substrate 110; and a liquid crystal layer 150 located between the base substrate 110 and the opposing substrate and located between a space between the spacers 132, the opposing substrate 190 includes a substrate 191, a common electrode 192 located at a side of the substrate 191 close to the liquid crystal antenna substrate 100, and a radiation patch 195 at a side of the substrate 191 away from the liquid crystal antenna substrate 100. The common electrode 192 has an opening 1920 in an overlapping region between the radiation patch 195 and the conductive pattern 120.

For example, the liquid crystal antenna can use the dielectric anisotropy of the liquid crystal molecular material to control a rotation direction of the liquid crystal molecules by the conductive pattern so as to change a magnitude of a shifted phase of the phase shifter, thereby adjusting an alignment direction of the phased array antenna.

For example, in some exemplary embodiments, as illustrated in FIG. 6, the opposing substrate 190 includes a substrate 191, a common electrode pattern 192 on the substrate 191, and an alignment film 193 located at a side of the common electrode pattern 192 away from the substrate 191. The alignment film 140 and the alignment film 193 may be collectively used to align liquid crystal molecules in the liquid crystal layer 150.

The following should be explained.

(1) The accompanying drawings involve only the structure(s) in connection with the embodiment(s) of the present disclosure, and other structure(s) may be referred to common design(s).

(2) In case of no conflict, features in one embodiment or in different embodiments may be combined.

The above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A manufacturing method of a liquid crystal antenna substrate, comprising:
    forming a conductive pattern on a base substrate;
    coating a liquid photo-curable material at a side of the conductive pattern away from the base substrate;
    providing a liquid crystal material at a position corresponding to the conductive pattern; and
    performing an exposure process on the liquid photo-curable material from a side of the base substrate away from the conductive pattern by using the conductive pattern as a mask,
    wherein a portion of the liquid photo-curable material not corresponding to the conductive pattern is cured to form spacers;
    the manufacturing method further comprises: removing all of a portion of the liquid photo-curable material that is uncured after performing the exposure process from the side of the base substrate away from the conductive pattern by using the conductive pattern as a mask;
    wherein the forming the conductive pattern on the base substrate comprises forming bent conductive lines on the base substrate, and an orthographic projection of the bent conductive lines on the base substrate is not overlapped with the orthographic projection of the spacers on the base substrate, and the orthographic projection of the bent conductive lines on the base substrate abuts against the orthographic projection of the spacers on the base substrate to occupy a complete area.

2. The manufacturing method of the liquid crystal antenna substrate according to claim 1, wherein removing the portion of the liquid photo-curable material that is uncured comprises:
    using a solvent to dissolve and remove the portion of the liquid photo-curable material that is uncured.

3. The manufacturing method of the liquid crystal antenna substrate according to claim 1, wherein the liquid photo-curable material comprises an epoxy resin, a diluent, and a photoinitiator.

4. The manufacturing method of the liquid crystal antenna substrate according to claim 1, wherein a material of the conductive pattern is an opaque material.

5. The manufacturing method of the liquid crystal antenna substrate according to claim 1, wherein the spacers are configured to be in contact with an opposing substrate to maintain a gap between the liquid crystal antenna and the opposite substrate, a size of the spacers in a direction perpendicular to the base substrate is greater than 50 microns.

6. The manufacturing method of the liquid crystal antenna substrate according to claim 1, further comprising:
forming an alignment film at the side of the conductive pattern away from the base substrate before coating the liquid photo-curable material at the side of the conductive pattern away from the base substrate.

7. A manufacturing method of a liquid crystal antenna, comprising:
manufacturing a liquid crystal antenna substrate by using the manufacturing method of the liquid crystal antenna substrate according to claim 1;
providing a liquid crystal molecular material between adjacent ones of the spacers; and
providing an opposing substrate at a side of the spacers away from the base substrate,
wherein the opposing substrate includes a substrate, a common electrode located at a side of the substrate close to the liquid crystal antenna substrate and a radiation patch located at a side of the substrate away from the liquid crystal antenna substrate, and the common electrode has an opening in an overlapping region of the radiation patch and the conductive pattern.

8. The manufacturing method of the liquid crystal antenna substrate according to claim 1, wherein the spacers are configured to be in contact with an opposing substrate to maintain a gap between the liquid crystal antenna and the opposite substrate, a size of the spacers in a direction perpendicular to the base substrate is greater than 50 microns.

9. A liquid crystal antenna substrate, comprising:
a base substrate;
a conductive pattern located on the base substrate;
a liquid crystal material provided at a position corresponding to the conductive pattern; and
spacers located at a side of the conductive pattern away from the base substrate,
wherein a shape of an orthographic projection of the conductive pattern on the base substrate is complementary to a shape of an orthographic projection of the spacers on the base substrate; and
the conductive pattern on the base substrate comprises bent conductive lines, and an orthographic projection of the bent conductive lines on the base substrate is not overlapped with the orthographic projection of the spacers on the base substrate, and the orthographic projection of the bent conductive lines on the base substrate abuts against the orthographic projection of the spacers on the base substrate to occupy a complete area.

10. The liquid crystal antenna substrate according to claim 9, wherein a material of the conductive pattern is an opaque material.

11. The liquid crystal antenna substrate according to claim 9, wherein the spacers are configured to be in contact with an opposing substrate to maintain a gap between the liquid crystal antenna and the opposite substrate, a size of the spacers in a direction perpendicular to the base substrate is greater than 50 microns.

12. The liquid crystal antenna substrate according to claim 9, further comprising: an alignment film between the conductive pattern and the spacers.

13. A liquid crystal antenna, comprising:
the liquid crystal antenna substrate according to claim 9;
an opposing substrate located at a side of the spacers away from the base substrate; and
a liquid crystal layer located between the base substrate and the opposing substrate and located between adjacent ones of the spacers,
wherein the opposing substrate includes a substrate, a common electrode located at a side of the substrate close to the liquid crystal antenna substrate, and a radiation patch located at a side of the substrate away from the liquid crystal antenna substrate, and the common electrode has an opening in an overlapping region of the radiation patch and the conductive pattern.

* * * * *